United States Patent
Manadhata et al.

(10) Patent No.: US 8,572,007 B1
(45) Date of Patent: Oct. 29, 2013

(54) SYSTEMS AND METHODS FOR CLASSIFYING UNKNOWN FILES/SPAM BASED ON A USER ACTIONS, A FILE'S PREVALENCE WITHIN A USER COMMUNITY, AND A PREDETERMINED PREVALENCE THRESHOLD

(75) Inventors: Pratyusa Manadhata, Piscataway, NJ (US); Kent Griffin, Los Angeles, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 348 days.

(21) Appl. No.: 12/916,267

(22) Filed: Oct. 29, 2010

(51) Int. Cl.
*G06F 11/00* (2006.01)

(52) U.S. Cl.
USPC ............................................. 706/12; 726/13

(58) Field of Classification Search
USPC ................ 706/12, 47, 62; 717/174, 168, 189; 713/2; 726/13
See application file for complete search history.

(56) References Cited

U.S. PATENT DOCUMENTS

| | | | |
|---|---|---|---|
| 7,269,851 B2 | 9/2007 | Ackroyd | |
| 7,831,412 B1 | 11/2010 | Sobel | |
| 2005/0060643 A1* | 3/2005 | Glass et al. | 715/501.1 |
| 2005/0283622 A1* | 12/2005 | Hall et al. | 713/190 |
| 2005/0283831 A1 | 12/2005 | Ryu et al. | |
| 2006/0253584 A1 | 11/2006 | Dixon et al. | |
| 2007/0300215 A1* | 12/2007 | Bardsley | 717/168 |
| 2008/0059590 A1* | 3/2008 | Sarafijanovic et al. | 709/206 |
| 2012/0072983 A1* | 3/2012 | McCusker et al. | 726/22 |

OTHER PUBLICATIONS

Damiani et al., P2P-Based Collaborative Spam Detection and Filtering, 2004, International Conference on Peer-to-Peer Computing, pp. 1-8.*
Kong et al., Collaborative spam filtering using e-mail networks, 2006, UC Los Angeles, IEEE, pp. 67-73.*
Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Sourabh Satish et al.; Social Trust Based Security Model; Mar. 31, 2006; U.S. Appl. No. 11/394,846.

* cited by examiner

*Primary Examiner* — David Vincent
(74) *Attorney, Agent, or Firm* — ALG Intellectual Property, LLC

(57) ABSTRACT

A computer-implemented, server-side method for classifying unknown files based on user actions may include (1) identifying at least one file whose trustworthiness is unknown, (2) identifying a report received from at least one client device that identifies at least one action taken by a user within a user community when informed by security software on the client device that the trustworthiness of the file is unknown, (3) determining that the action taken by the user indicates that the user believes the file is trustworthy, (4) classifying the file as trustworthy based at least in part on the action taken by the user, and then (5) providing the file's classification to at least one computing device in order to enable the computing device to evaluate the trustworthiness of the file. Corresponding systems, encoded computer-readable media, and client-side methods are also disclosed.

20 Claims, 8 Drawing Sheets

Reputation Information
512

File Name: foo.exe
File Hash: 0xEF9A0349
File Reputation Score: N/A
Prevalence: 20
Number of Installs: 12

Reputation Information
514

User ID: johndoe
User Reputation Score: 98%

FIG. 5

SYSTEMS AND METHODS FOR CLASSIFYING UNKNOWN FILES/SPAM BASED ON A USER ACTIONS, A FILE'S PREVALENCE WITHIN A USER COMMUNITY, AND A PREDETERMINED PREVALENCE THRESHOLD

BACKGROUND

In a reputation-based security system, a security-software vendor may attempt to determine the trustworthiness of a file by collecting, aggregating, and analyzing information from potentially millions of user devices within a community, such as the vendor's user base. For example, by determining a file's origin, age, and prevalence within a community, among other details (such as whether the file is predominantly found on at-risk or "unhealthy" machines within the community), a security-software vendor may gain a fairly accurate understanding as to the trustworthiness of the file.

Unfortunately, prior to collecting sufficient information about a file, reputation-based security systems may be unable to accurately determine the trustworthiness of the file. As a result, rather than running the risk of producing a false negative or false positive, reputation-based security systems may classify the file's trustworthiness as unknown and allow users to download or install the file at their own discretion. In this example, upon encountering a file whose trustworthiness is unknown, some users within a community may decide to download or install the file based on a personal knowledge of or belief in the file's (or file source's) legitimacy.

Although such user actions (e.g., downloading or installing the file) may provide additional information about the trustworthiness of the file based on users' personal knowledge, current reputation-based security systems typically fail to take advantage of this additional source of information when classifying the trustworthiness of files. As such, the instant disclosure identifies a need for systems and methods for classifying unknown files based at least in part on actions taken by users within a community.

SUMMARY

As will be described in greater detail below, the instant disclosure generally relates to systems and methods for classifying unknown files based on user actions. In one example, a server or backend may accomplish such a goal by (1) identifying at least one file whose trustworthiness is unknown, (2) identifying a report (such as a server ping) received from at least one client device that identifies at least one action (such as installing the file) taken by a user within a user community (such as an enterprise or the user base of a security-software vendor) when informed by security software on the client device that the trustworthiness of the file is unknown, (3) determining that the action taken by the user indicates that the user believes the file is trustworthy, (4) classifying the file as trustworthy based at least in part on the action taken by the user, and then (5) providing the file's classification to at least one computing device (such as the client device in question or an additional client device) in order to enable the computing device to evaluate the trustworthiness of the file.

In one embodiment, the server or backend may identify an initial trustworthiness classification assigned to the file and a confidence score associated with the initial trustworthiness classification. In this embodiment, the server or backend may determine that the confidence score fails to satisfy a predetermined threshold. The server or backend may then reclassify the file's trustworthiness as unknown due to the low confidence score associated with the initial classification. In some examples, the confidence score may fail to satisfy the predetermined threshold because the file's prevalence within the user community fails to satisfy a predetermined threshold.

In one example, the server or backend may, by collecting, aggregating, and analyzing reports from users within the user community that have encountered the file, determine that actions taken by such users indicate that they believe the file is trustworthy. The server or backend may accomplish this in a variety of ways, including by computing an install score that represents a function of the number of users within the user community that installed the file relative to the number of users within the user community that blocked or quarantined the file. In this example, the server or backend may classify the file as trustworthy upon determining that the install score for the file satisfies a threshold that represents a minimum level of trustworthiness for the file. In one example, the server or backend may determine this threshold by iterating over a set of values (such as install scores for various files) and identifying the value that minimizes false positives and maximizes true positives.

In some examples, the server or backend may assign a weight to one or more of the user actions in order to increase or decrease the actions' influence in the computation of the install score. In one example, the weight may be associated with the reputation of a user that installed the file. In another example, the weight may represent a function of the number of users that installed the file relative to the number of users that encountered the file.

In at least one example, the server or backend may use one or more attributes of the file (such as the number of users that installed the file and/or a weighted or non-weighted install score for the file) to train a classification heuristic capable of determining the trustworthiness of files. In some examples, the server or backend may then deploy the classification heuristic in order to identify trustworthy files within the user community.

In another example, a client device may identify a file that has been classified as trustworthy based at least in part on user actions reported in the server-side process outlined above. In this example, the client device may accomplish such a goal by (1) identifying a file, (2) querying a server for a trustworthiness classification assigned to the file, (3) receiving, from the server, a trustworthiness classification assigned to the file that indicates that the file is likely trustworthy, and then (4) allowing the file to install on the client device. As detailed above, the trustworthiness classification assigned to the file by the server may be based at least in part on at least one action (such as installing the file) taken by a user of at least one additional client device when informed by security software on the additional client device that the trustworthiness of the file is unknown. In this example, the action taken by the user may indicate that the user believes the file is trustworthy As will be explained in greater detail below, the various systems and methods described herein may be able to accurately determine trustworthiness of a file based at least in part on actions taken by users when informed that the trustworthiness of the file is unknown. As such, these systems and methods may effectively take advantage of this additional source of information (i.e., user actions) in order to successfully identify trustworthy files at an earlier point in time than is possible in conventional systems without unduly increasing false-negative rates within a community.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of exemplary reputation information that may be used to determine that a file is trustworthy.

Figure 1:
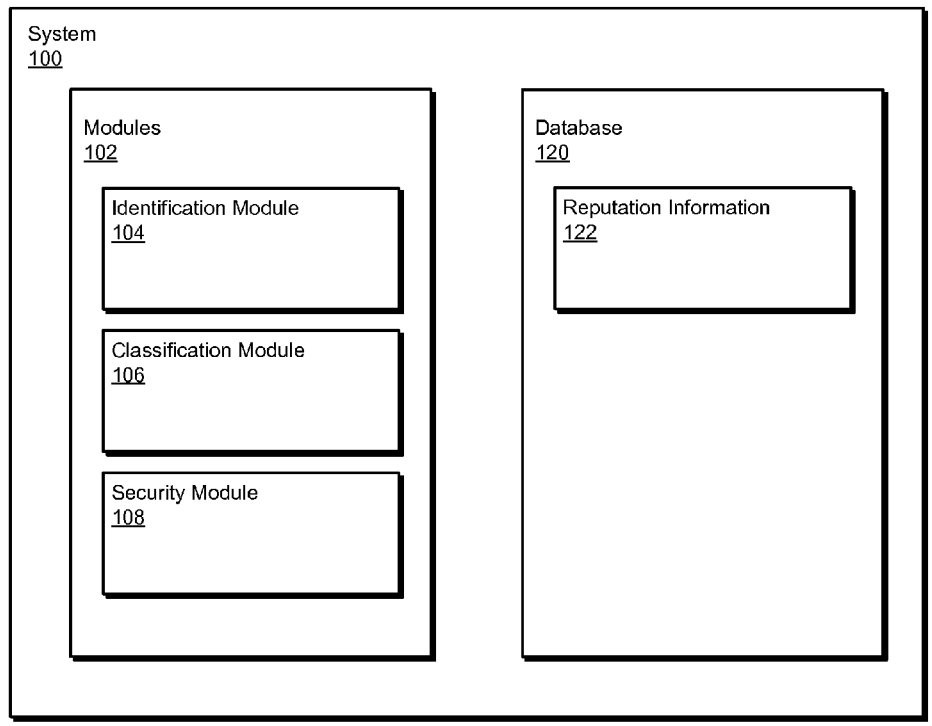
FIG. 1 is a block diagram of an exemplary system for classifying unknown files based on user actions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
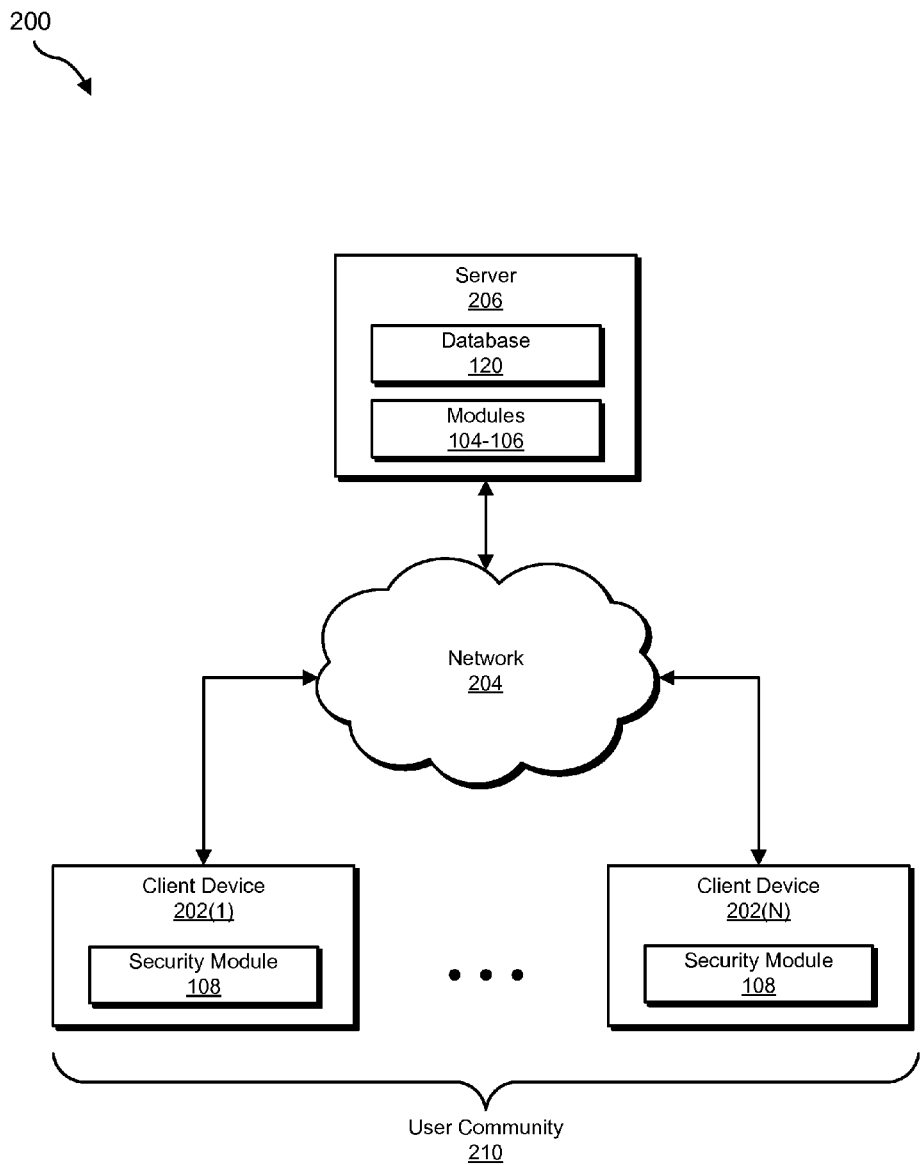
FIG. 2 is a block diagram of an exemplary system for classifying unknown files based on user actions.

The following will provide, with reference to FIGS. 1-2, detailed descriptions of exemplary systems for classifying unknown files based on user actions. Detailed descriptions of corresponding computer-implemented methods will also be provided in connection with FIG. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for classifying unknown files based on user actions. As illustrated in this figure, exemplary system 100 may include one or more modules 102 for performing one or more tasks. For example, and as will be explained in greater detail below, exemplary system 100 may include an identification module 104 programmed to (1) identify at least one file whose trustworthiness is unknown and/or (2) identify a report received from at least one client that identifies at least one action taken by a user within a user community when informed by security software on the client device that the trustworthiness of the file is unknown.

In addition, and as will be described in greater detail below, exemplary system 100 may include a classification module 106 programmed to (1) determine that the action taken by the user indicates that the user believes that the file is trustworthy, (2) classify the file as trustworthy based at least in part on the action taken by the user, and then (3) provide the file's classification to at least one computing device in order to enable the computing device to evaluate the trustworthiness of the file. Exemplary system 100 may also include a security module 108 programmed to identify a file that has been classified as trustworthy based at least in part on user actions reported in the server-side process outlined above. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., client devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, the various systems described herein may store reputation information 122 within database 120. As will be explained in greater detail below, reputation information 122 may represent information that identifies the reputation or prevalence of one or more files within a community (such as an enterprise or the user base of a security-software vendor) and/or the number of times the file has been installed on computing devices within the community.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 and/or client devices 202(1)-(N) in FIG. 2, computing system 710 in FIG. 7, and/or portions of exemplary network architecture 800 in FIG. 8.

Exemplary system 100 in FIG. 1 may be deployed in a variety of ways. For example, all or a portion of exemplary system 100 may represent portions of exemplary system 200 in FIG. 2. As shown in FIG. 2, system 200 may include a plurality of client devices 202(1)-(N) in communication with a server 206 via a network 204.

In one embodiment, and as will be described in greater detail below, identification module 104 and/or classification module 106 may program server 206 to classify unknown files based on user actions by (1) identifying at least one file whose trustworthiness is unknown, (2) identifying a report received from at least one client device (such as one or more of client devices 202(1)-(N)) that identifies at least one action (such as installing the file) taken by a user within a user community (such as an enterprise or the user base of a security-software vendor) when informed by security software on the client device that the trustworthiness of the file is unknown, (3) determining that the action taken by the user indicates that the user believes the file is trustworthy, (4)

classifying the file as trustworthy based at least in part on the action taken by the user, and then (5) providing the file's classification to at least one computing device (such as the client device in question or an additional client device) in order to enable the computing device to evaluate the trustworthiness of the file.

Similarly, security module 108 may program one or more of client devices 202(1)-(N) to identify files that have been classified as trustworthy based at least in part on user actions by (1) identifying a file, (2) querying a server (such as server 206) for a trustworthiness classification assigned to the file, (3) receiving, from the server, a trustworthiness classification assigned to the file that indicates that the file is likely trustworthy, and then (4) allowing the file to install on the client device. As detailed above, the trustworthiness classification assigned to the file by the server may be based at least in part on at least one action (such as installing the file) taken by a user of at least one additional client device when informed by security software on the additional client device that the trustworthiness of the file is unknown. In this example, the action taken by the user may indicate that the user believes the file is trustworthy.

Client devices 202(1)-(N) generally represent any type or form of computing device capable of reading computer-executable instructions. Examples of client devices 202(1)-(N) include, without limitation, laptops, desktops, servers, cellular phones, personal digital assistants (PDAs), multimedia players, embedded systems, combinations of one or more of the same, exemplary computing system 710 in FIG. 7, or any other suitable computing device. In one example, client devices 202(1)-(N) may represent computing devices within a user community (e.g., user community 210), such as an enterprise or the user base of a security-software vendor.

Server 206 generally represents any type or form of computing subsystem (such as a reputation service) capable of generating and/or receiving information that identifies a file's reputation and/or prevalence as well as any actions taken by users on the file. As will be explained in greater detail below, in some examples server 206 may generate such information by collecting, aggregating, and analyzing data from potentially millions of user devices within a community (such as an enterprise or user base of a security-software vendor).

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between client devices 202(1)-(N) and server 206.

Figure 3:
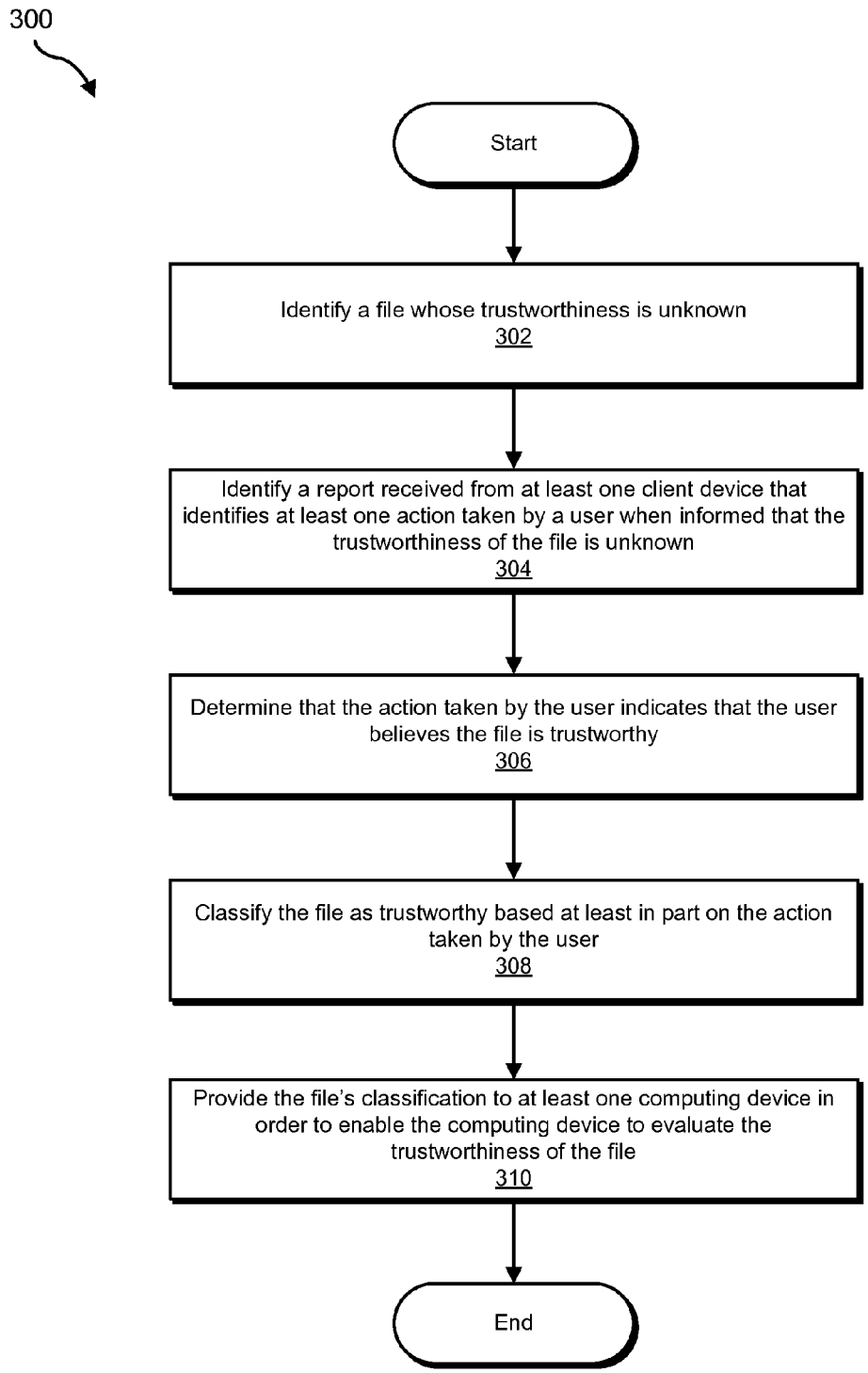
FIG. 3 is a flow diagram of an exemplary server-side method for classifying unknown files based on user actions.

FIG. 3 is a flow diagram of an exemplary computer-implemented, server-side method 300 for classifying unknown files based on user actions. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 the various systems described herein may identify at least one file (such as an executable or DLL) whose trustworthiness is unknown. For example, identification module 104 may, as part of server 206 in FIG. 2, identify an executable file encountered by at least one client device (e.g., client device 202(1)) within user community 210. In this example, upon identifying the executable file, identification module 104 may determine that the trustworthiness of the executable file is unknown due to insufficient information collected by server 206 about the file.

The systems described herein may perform step 302 in a variety of ways. In one example, identification module 104 may identify a report (such as a server ping) received from a client device (e.g., client device 202(1)) that indicates that the client device has encountered a file whose trustworthiness is unknown. In this example, the report may uniquely identify both the file (using, e.g., the name of the file and/or a hash of the file) and a user (using, e.g., a user ID) associated with the client.

Additionally or alternatively, identification module 104 may obtain reputation information for a file from database 120 that indicates that the file's trustworthiness is unknown. The term "reputation information," as used herein, generally refers to information that identifies a file's reputation, attributes, or prevalence within a community (such as the user base of a security-software vendor). Reputation information may also include information that identifies at least one user and/or the user's reputation (e.g., a reputation score for the user). Examples of reputation information include, without limitation, reputation scores for files (where, for example, high reputation scores indicate that a file is generally trusted within a community and low reputation scores indicate that a file is generally untrusted within a community), prevalence information (e.g., information that identifies the number or percentage of user devices within a community that have encountered an instance of the file), install information (e.g., information that identifies the number or percentage of user devices within a community that installed the file upon encountering an instance of the file), reputation scores for users (e.g., information that identifies a reputation for one or more users within a user community), or any other information that may be used to identify a community's opinion on the trustworthiness or legitimacy of a file, such as the file's location, origin, age, etc.

As indicated above, reputation services may generate reputation information for files by collecting, aggregating, and analyzing data from user devices within a community. Examples of information gathered from user devices within a community that may be used to generate reputation information include, without limitation, information that identifies the overall health of a user device (i.e., information that identifies the performance, stability, and/or state of security of the user device), information that identifies the files stored on or encountered by a user device, information that identifies the impact of a file on the health of the user device (e.g., information that identifies the health of a user device both before and after a file is encountered by the user device), and any other information that may be used to evaluate the trustworthiness of a file. In some examples, by collecting, aggregating, and analyzing this data from potentially millions of user devices within a community (such as the user base of a security-software vendor), reputation services may be able to gain a fairly accurate understanding as to the trustworthiness of a file.

Figure 4:
FIG. 4 is an illustration of an exemplary report generated by a client device upon detecting a user action taken on a file whose trustworthiness is unknown.

By way of illustration, at step 302 identification module 104 may, as part of server 206 in FIG. 2, identify a report 400 in FIG. 4 received from client device 202(1) that identifies a file encountered by client device 202(1). In this example, report 400 may include the name of the file ("foo.exe"), a hash of the file ("0xEF9A0349"), and/or the ID of a user associated with client device 202(1) ("johndoe"), among other information.

In one example, report 400 may indicate that the trustworthiness of the file in question is unknown. In another example, identification module 104 may determine that the trustworthiness of the file identified in report 400 is unknown by obtaining reputation information 512 in FIG. 5 from database 120 for the file in question. As illustrated in FIG. 5, reputation information 512 may contain information that identifies a reputation score associated with the file in question ("N/A," in this example, meaning "unknown").

In some examples, the systems described herein may determine that the trustworthiness of the file is unknown by determining that a confidence score associated with an initial trustworthiness classification assigned to the file fails to satisfy a predetermined threshold. For example, identification module 104 may determine that the file in question has been classified as "trustworthy" with a relatively low degree of confidence (e.g., "25%") due to insufficient data about the file. In this example, identification 104 may determine that this low confidence score fails to satisfy a predetermined threshold (e.g., "75%"), such that the file must be classified as "unknown."

In some examples, the confidence score associated with the initial trustworthiness classification may vary based on the prevalence of the file within user community 210. For example, the confidence score may increase as the prevalence of the file increases within user community 210. In this example, identification module 104 may, in essence, determine that the trustworthiness of the file is unknown if the prevalence of the file within user community 210 fails to satisfy a predetermined threshold. For example, identification module 104 may determine that the trustworthiness of the file is unknown if a predetermined threshold requires at least 50 client devices within user community 210 to have encountered instances of the file but only 20 client devices within user community 210 have actually encountered the file.

Returning to FIG. 3, at step 304 the various systems described herein may identify a report (such as report 400 in FIG. 4) received from at least one client device that identifies at least one action taken by a user within a user community when informed by security software on the client device that the trustworthiness of the file is unknown. For example, identification module 104 may, as part of server 206, identify a report received from client device 202(1) that indicates that a user of client device 202(1) decided to install the file in question despite the file's trustworthiness being unknown. In this example, client device 202(1) may be configured to inform the user upon encountering the file that the file's trustworthiness is unknown.

The systems described herein may perform step 304 in a variety of ways. In one example, identification module 104 may identify the report upon receiving the same. In other examples, identification module 104 may identify the report non-contemporaneously with respect to receipt of the same. As will be described in greater detail below in connection with FIG. 6, in some examples client devices 202(1)-(N) may be configured to send such reports to server 206 either sua sponte (e.g., immediately upon identifying a user action taken on a file and/or at periodic intervals) and/or at the request of server 206.

As detailed above, the report identified in step 304 may include a variety of information, including information that identifies the name of the file, the hash of the file, the action taken by the user, a user ID of the user who took the action on the file, the URL from which the file was downloaded, and the date on which the file was downloaded. In the example illustrated in FIG. 4, exemplary report 400 in FIG. 4 may indicate that the user "johndoe" decided to install the file "foo.exe" even after security software on client 202(1) informed the user that the trustworthiness of this file was unknown.

Returning to FIG. 3, at step 306 the various systems described herein may determine that the action taken by the user indicates that the user believes the file is trustworthy. For example, classification module 106 may determine that the user's decision to install the file on client device 202(1) despite the file's trustworthiness being unknown indicates that the user has a personal knowledge of and/or belief in the file's (or file source's) legitimacy.

The systems described herein may perform step 306 in a variety of ways. In one example, classification module 106 may operate under the assumption that a user within user community 210 only installs a file whose trustworthiness is unknown if the user has a personal knowledge of and/or belief in the file's (or file source's) legitimacy. In another example, classification module 106 may only make such an assumption if the user's reputation satisfies a predetermined threshold (i.e., if the reputation of the user indicates that the user generally only installs trusted software).

In some examples, classification module 106 may aggregate and analyze reports received from a plurality of client devices within the community when performing step 306. For example, classification module 106 may identify, by analyzing reports gathered from a plurality of client devices, the number of users within user community 210 that installed the file, the number of users within user community 210 that blocked the file, and/or the number of users within user community 210 that quarantined the file. In this example, classification module 106 may then compute an install score that represents a function of the number of users within user community 210 that installed the file relative to the number of users within the user community that blocked or quarantined the file. For example, classification module 106 may compute an install score for the file identified in step 302 by dividing the number of times the file has been installed by users within user community 210 by the number of times the file has been installed, blocked, or quarantined (or in other words, the number of times the file has been encountered) by users within user community 210.

Upon computing the install score for the file, classification module 106 may determine whether this install score satisfies a predetermined minimum threshold. If so, then classification module 108 may determine that the overall consensus among users within the community is that the file is trustworthy. In some examples, the systems described herein may select this predetermined minimum threshold by iterating over a set of values in order to identify a value that minimizes false positives and maximizes true positives for files encountered within the user community.

In some examples, classification module 106 may assign a weight to one or more of the actions taken by users within user community 210 in order to increase or decrease the actions' influence in the computation of the install score. In one example, the respective weight assigned to each user action may be associated with the reputation of the user (e.g., a reputation score associated with the user) who took the action on the file in question. For example, if the user of client device 202(1) possess a reputation score that satisfies a predetermined threshold, the action taken by the user of client device 202(1) may be assigned a weight that increases the action's influence in the computation of install score for the file in question.

In another example, the respective weight assigned to each user action may represent a function of the number of users within user community 210 that installed the file in question relative to the number of users within user community 210 that encountered (e.g., installed, blocked, or quarantined) the file in question. In this example, classification module 106 may compute such a function by dividing a logarithm of the number of users that installed the file by a logarithm of the number of users that encountered (e.g., installed, blocked, or quarantined) the file.

Returning to FIG. 3, at step 308 the various systems described herein may classify the file as trustworthy based at least in part on the action taken by the user. For example, classification module 106 may classify the file in question as trustworthy based at least in part on the user's decision to install the file despite the file's trustworthiness being unknown at the time that the user made the decision. In some examples, classification module 106 may classify the file as trustworthy in response to determining that the user and/or the user community believes that the file is trustworthy.

The systems described herein may perform step 308 in a variety of ways. In one example, classification module 106 may classify the file by (1) assigning a classification to the file and then (2) storing this classification within database 120. In another example, classification module 106 may provide the file's classification to one or more client devices within user community 210.

Returning to FIG. 3, at step 310 the various systems described herein may provide the file's classification to at least one computing device (such as client devices 202(1)-(N)) in order to enable the computing device to evaluate the trustworthiness of the file. For example, classification module 106 may receive, from client device 202(N), a request for the file's classification after client device 202(N) has encountered an instance of the file in question. In this example, the file's classification may be represented by a reputation score (such as a percentage) indicating that the overall consensus among user community 210 is that the file is trustworthy.

The systems described herein may perform step 310 in a variety of ways. In one example, classification module 106 may provide the file's classification to the client device that originally provided the report that identified the user action (e.g., client device 202(1)). In another example, classification module 106 may provide the file's classification to one or more additional client devices, such as client devices 202(2)-(N). In either example, the client device may then use this classification in evaluating the trustworthiness of the file in question, as will be described in greater detail below in connection with FIG. 6. Upon completion of step 310, exemplary method 300 in FIG. 3 may terminate.

Although not illustrated in FIG. 3, method 300 may also include one or more additional steps for classifying unknown files based on user actions. In one example, classification module 106 may include the file in question within a training corpus to be used when training a classification heuristic. The phrase "training corpus," as used herein, may refer to a collection of files, file attributes, items, objects, or other information that may be analyzed or classified by a classification heuristic.

Examples of training corpus data include, without limitation, files (such as executables, DLLs, or the like), file attributes (such as the number of users within the user community that installed a file, an install score for a file, an install score weighted by at least one user reputation, an install score weighted by the number of users within the user community that installed a particular file relative to the number of users within the user community that encountered the particular file), or any other item or object that may be subject to classification or analysis.

In some examples, classification module 106 may use the training corpus to train a classification heuristic capable of determining the trustworthiness of files. For example, classification module 106 may customize a classification heuristic to identify file attributes indicative of malicious files as well as file attributes indicative of trustworthy files. In this example, the classification heuristic may then be deployed and applied to a set of field data (such as files encountered by client devices 202(1)-(N)) in order to detect malware within user community 210. The phrase "classification heuristic," as used herein, may refer to any type or form of heuristic, tool, or model capable of classifying a file as malicious or trustworthy.

Figure 6:
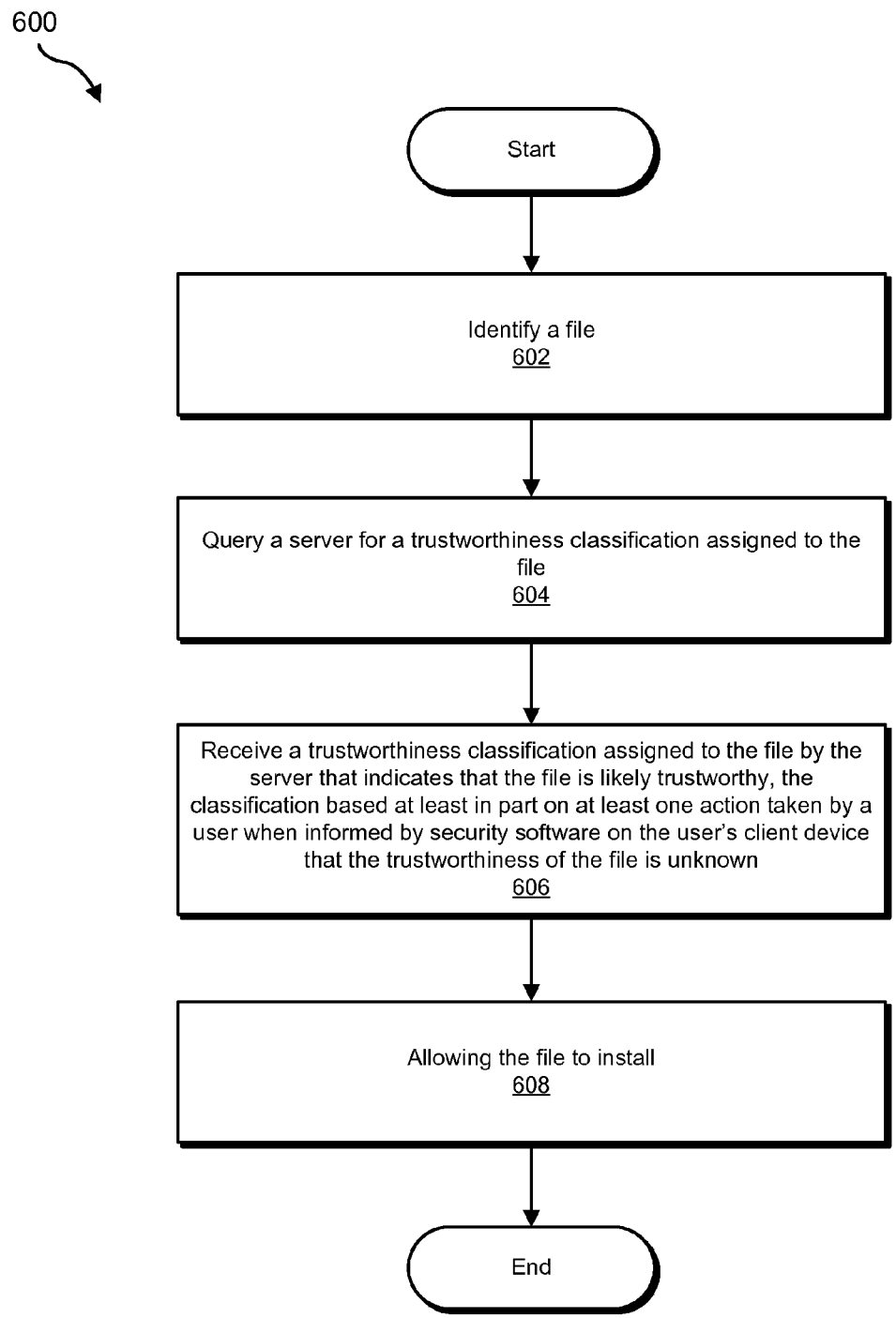
FIG. 6 is a flow diagram of an exemplary client-side method for identifying files that have been classified as trustworthy based on user actions.

As detailed above, client devices may identify files that have been classified as trustworthy based at least in part on user actions in accordance with the exemplary method outlined above in connection with FIG. 3. FIG. 6 is a flow diagram of an exemplary computer-implemented, client-side method 600 for identifying files that have been classified as trustworthy based at least in part on user actions. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, computing system 710 in FIG. 7, and/or portions of exemplary network architecture 800 in FIG. 8.

As illustrated in FIG. 6, at step 602 the systems described herein may identify a file. For example, security module 108 in FIG. 1 may, as part of client device 202(N) in FIG. 2, identify a file encountered by client device 202(N).

The systems described herein may identify a file in a variety of ways. In one example, security module 108 may identify a file upon encountering the same (whether in an email attachment, a webpage, or any other suitable entity). In this example, security module 108 may identify the name of the file (e.g., "foo.exe"), a hash of the file (e.g., "0xEF9A0349"), and/or any other identifying information associated with the file.

At step 604, the systems described herein may query a server or backend (e.g., a reputation service) for a trustworthiness classification assigned to the file identified in step 602. For example, security module 108 in FIG. 1 may, as part of client device 202(N) in FIG. 2, query server 206 for a trustworthiness classification assigned to the file identified in step 602.

In some examples, security module 108 may include a report within this query that indicates that client device 202(N) has encountered the file identified in step 602. As detailed above, this report may also include information that uniquely identifies (using, e.g., a file name and/or file hash) the file in question.

Returning to FIG. 6, at step 606 the systems described herein may receive a trustworthiness classification assigned to the file by the server that indicates that the file in question is likely trustworthy. For example, security module 108 in FIG. 1 may, as part of client device 202(N) in FIG. 2, receive a trustworthiness classification assigned to the file "foo.exe" from server 206 that indicates that this file is likely trustworthy. In one example, the trustworthiness classification may be represented by a reputation score (such as a percentage) that identifies the likelihood of the file being trustworthy.

As detailed above, this trustworthiness classification may be based at least in part on at least one action taken by a user of at least one additional client device (e.g., client device 202(1)) when informed by security software (such as antivirus software) on the additional client device that the trustworthiness of the file is unknown. For example, server 206 may (as explained in greater detail above in connection with FIG. 3) have assigned this trustworthiness classification to the file based at least in part on at least one action (e.g., installing the file) taken by a user of at least one additional client device within user community 210 that indicates that the user believed the file was trustworthy.

Returning to FIG. 6, at step 608 the systems described herein may allow the file to install on the client device. For example, security module 108 in FIG. 1 may, as part of client device 202(N) in FIG. 2, allow the file identified in step 602 to be installed on client device 202(N) upon receiving a trustworthiness classification from server 206 that indicates that the file is likely trustworthy. Upon completion of step 608, exemplary method 600 in FIG. 6 may terminate.

As explained above, the various systems and methods described herein may be able to accurately determine trustworthiness of a file based at least in part on actions taken by users when informed that the trustworthiness of the file is unknown. As such, these systems and methods may effectively take advantage of this additional source of information (i.e., user actions) in order to successfully identify trustworthy files at an earlier point in time than is possible in conventional systems without unduly increasing false-negative rates within a community.

Figure 7:
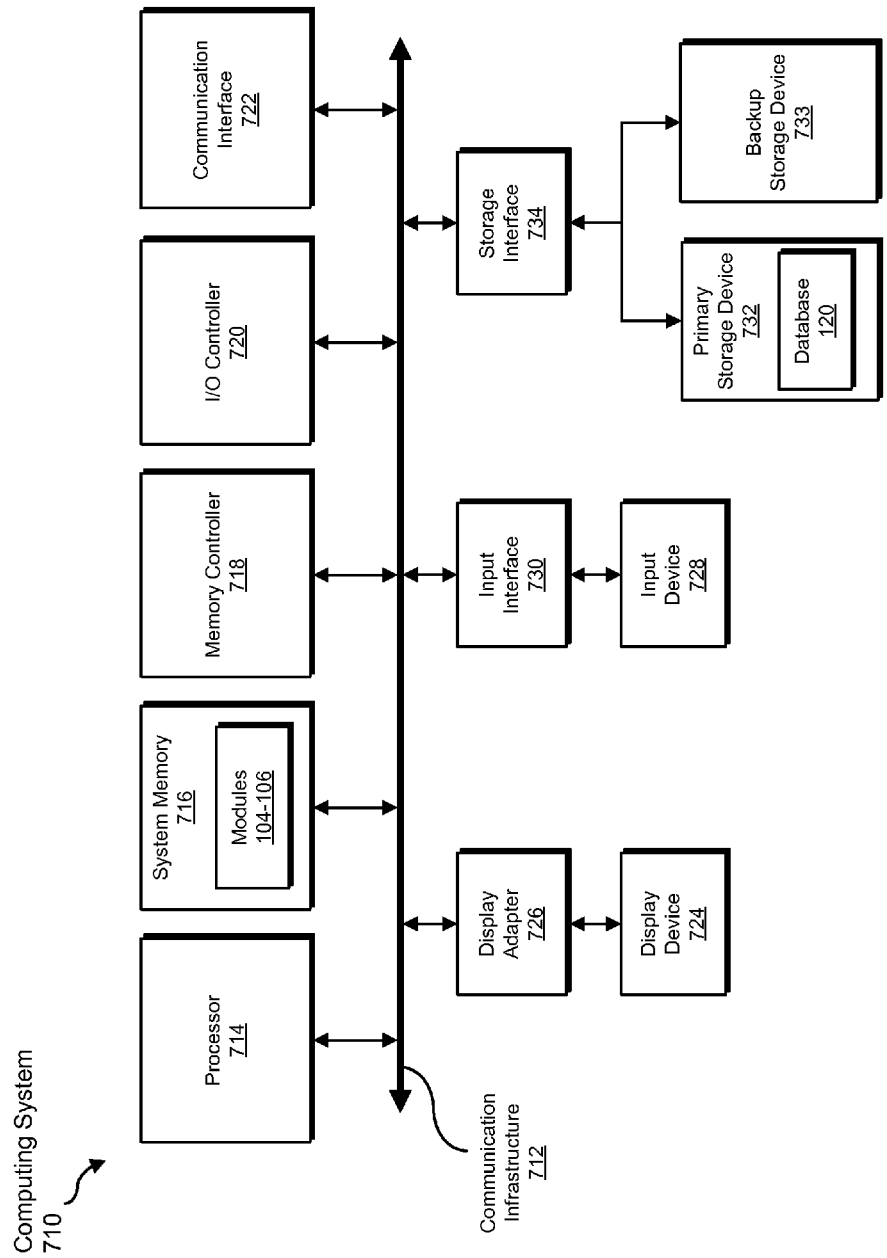
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, receiving, determining, classifying, providing, analyzing, computing, iterating, selecting, assigning, including, using, training, querying, and allowing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, receiving, determining, classifying, providing, analyzing, computing, iterating, selecting, assigning, including, using, training, querying, and allowing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, receiving, determining, classifying, providing, analyzing, computing, iterating, selecting, assigning, including, using, training, querying, and allowing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, receiving, determining, classifying, providing, analyzing, computing, iterating, selecting, assigning, including, using, training, querying, and allowing steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, receiving, determining, classifying, providing, analyzing, computing, iterating, selecting, assigning, including, using, training, querying, and allowing steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, receiving, determining, classifying, providing, analyzing, computing, iterating, selecting, assigning, including, using, training, querying, and allowing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
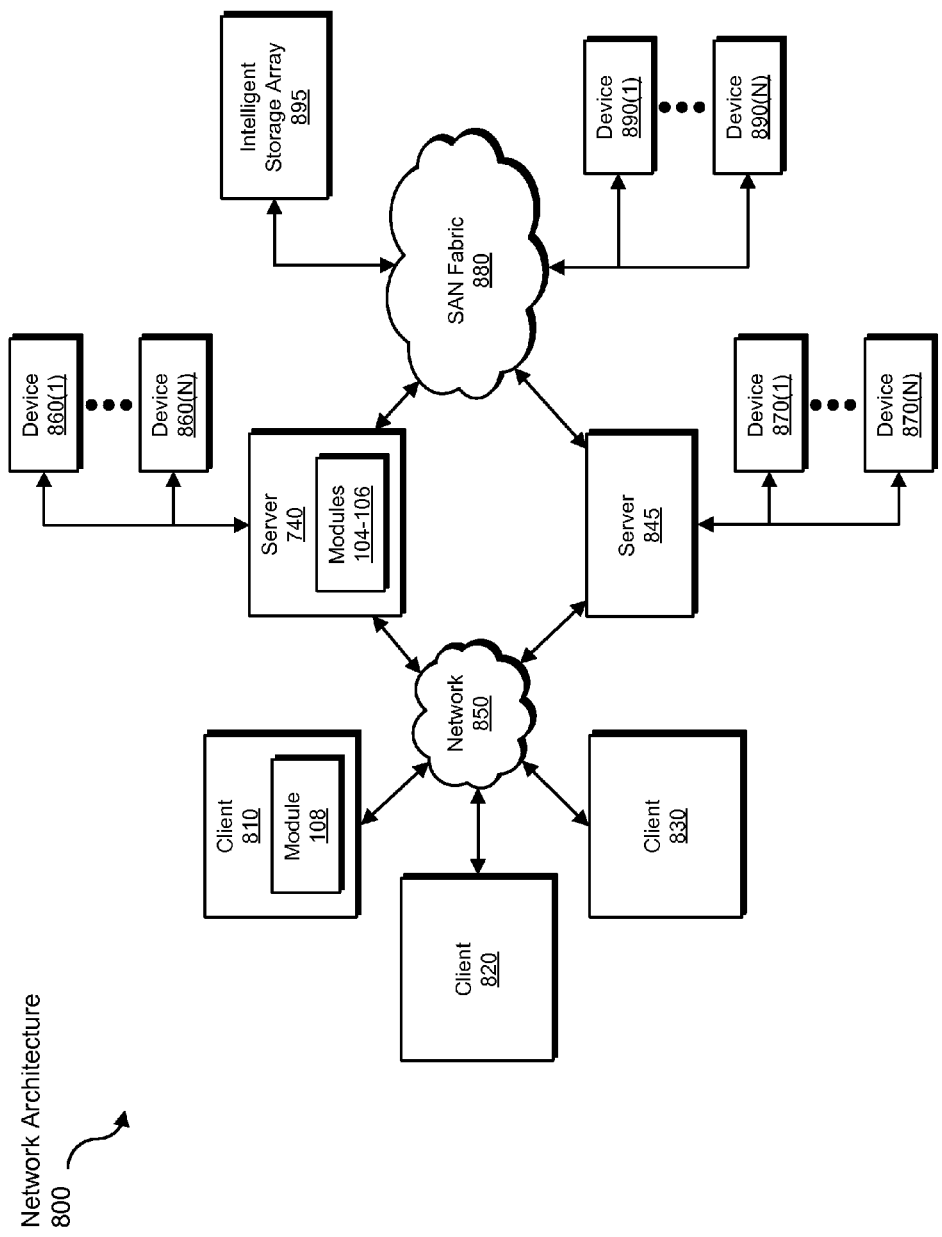
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, client systems 810, 820, and/or 830 and/or servers 840 and/or 845 may include system 100 from FIG. 1.

As illustrated in FIG. 8, one or more storage devices 860 (1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, receiving, determining, classifying, providing, analyzing, computing, iterating, selecting, assigning, including, using, training, querying, and allowing steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for classifying unknown files based on user actions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may transform a device (such as server 206 in FIG. 2) into a device capable of classifying unknown files based at least in part on user actions.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:
1. A computer-implemented method for classifying unknown files based on user actions, at least a portion of the method being performed by a server-side computing device comprising at least one processor, the method comprising:
- identifying at least one file whose trustworthiness is unknown due at least in part to the file's prevalence within a user community being below a predetermined prevalence threshold, wherein the predetermined prevalence threshold represents a minimum number of client devices within the user community that have encountered an instance of the file;
- identifying a report received from at least one client device that identifies at least one action taken by a user within the user community after being informed by security software on the client device that the trustworthiness of the file is unknown;
- determining that the action taken by the user indicates that the user believes the file is trustworthy even after being informed by the security software on the client device that the trustworthiness of the file is unknown;
- classifying the file as trustworthy based at least in part on the action taken by the user;
- providing the file's classification to at least one computing device in order to enable the computing device to evaluate the trustworthiness of the file.

2. The method of claim 1, wherein identifying the file whose trustworthiness is unknown comprises:
- identifying an initial trustworthiness classification assigned to the file;
- determining that a confidence score associated with the initial trustworthiness classification fails to satisfy a predetermined confidence threshold.

3. The method of claim 2, wherein determining that the confidence score associated with the initial trustworthiness classification fails to satisfy the predetermined confidence threshold comprises determining that the file's prevalence within the user community fails to satisfy the predetermined prevalence threshold.

4. The method of claim 1, wherein the action taken by the user comprises installing the file.

5. The method of claim 1, wherein identifying the report received from the client device comprises:
- identifying a plurality of reports received from a plurality of client devices that identify actions taken by users within the user community after being informed by security software on the client devices that the trustworthiness of the file is unknown;
- determining that the actions taken by the users indicate that the users believe the file is trustworthy even after being informed by the security software on the client devices that the trustworthiness of the file is unknown.

6. The method of claim 5, wherein determining that the actions taken by the users indicate that the users believe the file is trustworthy comprises:
- analyzing the actions taken by the users to identify at least one of:
  - the number of users within the user community that installed the file;
  - the number of users within the user community that blocked the file;
  - the number of users within the user community that quarantined the file;
- computing an install score that represents a function of the number of users within the user community that installed the file relative to the number of users within the user community that blocked or quarantined the file;
- computing a threshold that represents a minimum level of trustworthiness for the file;
- determining that the install score for the file satisfies the threshold.

7. The method of claim 6, wherein computing the threshold comprises:
- iterating over a set of values in order to identify a value that minimizes false positives and maximizes true positives;
- selecting the value as the threshold.

8. The method of claim 6, further comprising, prior to computing the install score, assigning a weight to one or more of the actions taken by the users in order to increase or decrease the actions' influence in the computation of the install score.

9. The method of claim 8, wherein the weight comprises at least one of:
- a weight associated with a user reputation;
- a weight that represents a function of the number of users within the user community that installed the file relative to the number of users within the user community that encountered the file.

10. The method of claim 1, further comprising:
- including the file within a training corpus;
- using the training corpus to train, based at least in part on at least one attribute of the file, a classification heuristic capable of determining the trustworthiness of files;
- deploying the classification heuristic.

11. The method of claim 10, wherein the attribute comprises at least one of:
- the number of users within the user community that installed the file;
- an install score for the file;
- an install score weighted by at least one user reputation;
- an install score weighted by the number of users within the user community that installed the file relative to the number of users within the user community that encountered the file.

12. The method of claim 1, wherein providing the file's classification to the computing device comprises at least one of:
- providing the file's classification to the client device;
- providing the file's classification to at least one additional client device.

13. A computer-implemented method for identifying files that have been classified as trustworthy based on user actions, at least a portion of the method being performed by a client device comprising at least one processor, the method comprising:
- identifying a file;
- querying a server for a trustworthiness classification assigned to the file;
- receiving, from the server, a trustworthiness classification assigned to the file that indicates that the file is likely trustworthy, wherein:
  - the trustworthiness classification assigned to the file by the server is based at least in part on at least one action taken by a user of at least one additional client device after being informed by security software on the additional client device that the trustworthiness of the file is unknown due at least in part to the file's prevalence within a user community being below a predetermined prevalence threshold, wherein the predetermined prevalence threshold represents a minimum number of client devices within the user community that have encountered an instance of the file;
  - the action taken by the user indicates that the user believes the file is trustworthy even after being informed by the security software on the client device that the trustworthiness of the file is unknown;
- allowing the file to install on the client device.

14. The method of claim 13, wherein the action taken by the user of the additional client device comprises installing the file on the additional client device.

15. A system for classifying unknown files based on user actions, the system comprising:

an identification module programmed to:

identify at least one file whose trustworthiness is unknown due at least in part to the file's prevalence within a user community being below a predetermined prevalence threshold, wherein the predetermined prevalence threshold represents a minimum number of client devices within the user community that have encountered an instance of the file;

identify a report received from at least one client device that identifies at least one action taken by a user within the user community after being informed by security software on the client device that the trustworthiness of the file is unknown; a classification module programmed to:

determine that the action taken by the user indicates that the user believes the file is trustworthy even after being informed by the security software on the client device that the trustworthiness of the file is unknown;

classify the file as trustworthy based at least in part on the action taken by the user;

provide the file's classification to at least one computing device in order to enable the computing device to evaluate the trustworthiness of the file;

at least one processor configured to execute the identification module and the classification module.

16. The system of claim 15, wherein the identification module is further programmed to:

identify an initial trustworthiness classification assigned to the file;

determine that a confidence score associated with the initial trustworthiness classification fails to satisfy a predetermined confidence threshold.

17. The system of claim 15, wherein the identification module is further programmed to:

identify an initial trustworthiness classification assigned to the file;

determine that the file's prevalence within the user community fails to satisfy the predetermined prevalence threshold.

18. The system of claim 15, wherein the action taken by the user comprises installing the file.

19. The method of claim 1, wherein:

determining that the action taken by the user indicates that the user believes the file is trustworthy comprises determining that the action taken by the user indicates that the user has a personal knowledge of the file's legitimacy;

classifying the file as trustworthy based at least in part on the action taken by the user comprises classifying the file as trustworthy due at least in part to the user's personal knowledge of the file's legitimacy.

20. The method of claim 1, wherein the minimum number of client devices within the user community that have encountered an instance of the file comprises a minimum percentage of client devices within the user community that have encountered an instance of the file.

\* \* \* \* \*

UNITED STATES PATENT AND TRADEMARK OFFICE
CERTIFICATE OF CORRECTION

| | |
|---|---|
| PATENT NO. | : 8,572,007 B1 |
| APPLICATION NO. | : 12/916267 |
| DATED | : October 29, 2013 |
| INVENTOR(S) | : Pratyusa Manadhata, Kent Griffin and Zulfikar Ramzan |

It is certified that error appears in the above-identified patent and that said Letters Patent is hereby corrected as shown below:

Title Page, item 54, and in the Specification, column 1, title should read:

SYSTEMS AND METHODS FOR CLASSIFYING FILES WHOSE PREVALANCE WITHIN A USER COMMUNITY IS BELOW A PREDETERMINED THRESHOLD BASED AT LEAST IN PART ON ACTIONS TAKEN BY USERS AFTER BEING INFORMED THAT THE TRUSTWORTHINESS OF THE FILES IS UNKNOWN

In the Claims

Claim 15, at column 19, lines 14 to 23, should read:

identify a report received from at least one client device that identifies at least one action taken by a user within the user community after being informed by security software on the client device that the trustworthiness of the file is unknown;

a classification module programmed to:

determine that the action taken by the user indicates that the user believes the file is trustworthy even after being informed by the security software on the client device that the trustworthiness of the file is unknown;

Signed and Sealed this
First Day of April, 2014

Michelle K. Lee
*Deputy Director of the United States Patent and Trademark Office*